US011211992B2

(12) United States Patent
Kang et al.

(10) Patent No.: US 11,211,992 B2
(45) Date of Patent: Dec. 28, 2021

(54) APPARATUS AND METHOD FOR ESTIMATING DIRECTION OF ARRIVAL IN MIMO SYSTEM

(71) Applicant: HYUNDAI MOBIS Co. Ltd., Seoul (KR)

(72) Inventors: Seok Hyun Kang, Yongin-si (KR); Wassim Suleiman, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/814,107

(22) Filed: Mar. 10, 2020

(65) Prior Publication Data

US 2020/0295816 A1    Sep. 17, 2020

(30) Foreign Application Priority Data

Mar. 11, 2019    (KR) ................. 10-2019-0027563

(51) Int. Cl.
| | | |
|---|---|---|
| *H04B 7/08* | (2006.01) | |
| *H04L 27/26* | (2006.01) | |
| *H04B 7/0413* | (2017.01) | |
| *H04B 7/01* | (2006.01) | |

(52) U.S. Cl.
CPC .............. *H04B 7/086* (2013.01); *H04B 7/01* (2013.01); *H04B 7/0413* (2013.01); *H04L 27/2636* (2013.01)

(58) Field of Classification Search
CPC .... H04B 7/01; H04B 7/0617; H04B 7/18513; H04B 17/21; H04B 10/508; H04B 7/08; H04B 7/0413; H04B 1/44; H04B 3/36; H04B 3/50; H04B 7/0452; H04B 7/086; H04L 27/2636

See application file for complete search history.

(56) References Cited

U.S. PATENT DOCUMENTS

| 7,607,710 | B2 * | 10/2009 | Yeo ..................... B60R 11/0235 248/917 |
| 9,554,228 | B2 * | 1/2017 | Park ........................ G08G 1/20 |
| 9,736,667 | B2 * | 8/2017 | Kim ........................ H04W 4/18 |
| 10,181,444 | B2 * | 1/2019 | Kang ..................... H01L 23/528 |
| 10,215,843 | B2 * | 2/2019 | Lee ........................ G01S 7/4021 |

(Continued)

FOREIGN PATENT DOCUMENTS

KR    10-2016-0134436    11/2016

*Primary Examiner* — James M Perez
(74) *Attorney, Agent, or Firm* — H.C. Park & Associates, PLC

(57) ABSTRACT

An apparatus for estimating a DOA in a MIMO system includes a receiver and a signal processor. The receiver receives Rx signals from a target through Rx antennas after Tx signals having different phases are transmitted through Tx antennas, and transforms the Rx signals into time domain Rx signals. The processor transforms the time domain Rx signals into Rx signals in a frequency domain including a range-related domain and a velocity-related doppler domain; divides the doppler domain into regions according to a phase difference between the Tx signals; extracts signals from the regions; combines the signals to form first and second arrays; determines a minimum value for each of the first and second arrays using a DML algorithm; selects one of the first and second arrays having the minimum value as a true array; and estimates a DOA corresponding to the true array as an actual DOA of the target.

8 Claims, 9 Drawing Sheets

(56) References Cited

U.S. PATENT DOCUMENTS

| | | | | |
|---|---|---|---|---|
| 10,389,421 | B2* | 8/2019 | Lee | H04L 5/0048 |
| 10,492,043 | B1* | 11/2019 | Kim | H04W 4/021 |
| 10,732,257 | B2* | 8/2020 | Lee | G01S 5/06 |
| 2006/0008022 | A1* | 1/2006 | Wight | H04B 7/0848 375/267 |
| 2010/0067632 | A1* | 3/2010 | Jia | H04L 27/2656 375/371 |
| 2011/0002410 | A1* | 1/2011 | Forenza | H04B 7/0626 375/267 |
| 2011/0002411 | A1* | 1/2011 | Forenza | H04L 1/0003 375/267 |
| 2011/0003607 | A1* | 1/2011 | Forenza | H04B 7/0626 455/501 |
| 2011/0003608 | A1* | 1/2011 | Forenza | H04B 7/024 455/501 |
| 2015/0030060 | A1* | 1/2015 | Kyosti | H04B 17/0087 375/224 |
| 2017/0059694 | A1* | 3/2017 | Lee | H01Q 21/08 |
| 2017/0285158 | A1* | 10/2017 | Halbert | G01S 13/726 |
| 2018/0175898 | A1* | 6/2018 | Kollmann | H04B 1/3822 |
| 2018/0254248 | A1* | 9/2018 | Kang | H01L 27/2418 |
| 2019/0013983 | A1* | 1/2019 | Gao | H04L 27/2655 |
| 2019/0135264 | A1* | 5/2019 | Shin | B60W 40/11 |
| 2019/0212411 | A1* | 7/2019 | Kang | G01S 3/46 |
| 2019/0302253 | A1* | 10/2019 | Santra | G01S 13/87 |
| 2019/0317205 | A1* | 10/2019 | Meissner | G01S 13/343 |
| 2020/0049812 | A1* | 2/2020 | Jansen | G01S 7/358 |
| 2020/0059280 | A1* | 2/2020 | Thurfjell | G01S 11/10 |
| 2020/0081110 | A1* | 3/2020 | Nam | G01S 13/931 |
| 2020/0233076 | A1* | 7/2020 | Chen | G01S 7/4865 |
| 2020/0287131 | A1* | 9/2020 | Kim | H01L 27/24 |
| 2020/0295816 | A1* | 9/2020 | Kang | G01S 13/584 |
| 2020/0373353 | A1* | 11/2020 | Kim | H01L 45/1675 |
| 2020/0393553 | A1* | 12/2020 | Kishigami | G01S 13/534 |
| 2021/0011121 | A1* | 1/2021 | Arbabian | G01S 7/4021 |
| 2021/0055734 | A1* | 2/2021 | Yokev | G08G 1/166 |
| 2021/0179147 | A1* | 6/2021 | Kang | B60W 40/105 |
| 2021/0232235 | A1* | 7/2021 | Regani | H04W 4/029 |

\* cited by examiner

APPARATUS AND METHOD FOR ESTIMATING DIRECTION OF ARRIVAL IN MIMO SYSTEM

CROSS-REFERENCE TO RELATED APPLICATION

This application claims priority to and the benefit of Korean Patent Application No. 10-2019-0027563, filed Mar. 11, 2019, which is hereby incorporated by reference for all purposes as if fully set forth herein.

BACKGROUND

Field

Exemplary embodiments generally relate to an apparatus and method for estimating a direction of arrival (DOA) through an arrangement of multiple transmit (Tx) antennas in a multiple input, multiple output (MIMO) system.

Discussion

When two vehicles ahead of an ego-vehicle are adjacent to each other in the same range from a radar sensor, a radar of the ego-vehicle should recognize that two vehicles, not one vehicle, are present ahead of the ego-vehicle. When the velocities and ranges of targets are similar to each other, accurately estimating DOAs of receive (Rx) signals received from the targets in order to separate the targets becomes of interest. As such, research into high-resolution Rx signal DOA estimation algorithms, such as the multiple signal classification (MUSIC) algorithm and the estimation of signal parameters via rotational invariance technique (ES-PRIT) algorithm, has been conducted. Furthermore, attention has been paid to the Bartlett DOA algorithm, which is less affected by a signal-to-noise ratio (SNR) than the MUSIC algorithm.

When a uniform linear array (ULA) antenna array is used to find a target, a narrow main beam width and a low side lobe are used to acquire precise resolution and high accuracy. When an antenna array has a wide aperture, a main lobe may have a narrow beam width. Such a narrow beam width makes it possible to distinguish between densely adjacent targets. However, side lobes and grating lobes may occur to disturb a process of deciding the position of a target. Further, the wide aperture of the antenna array occupies quite a large area.

A method and apparatus for estimating direction of arrival is disclosed in Korean Patent Application Publication No. 10-2016-0134436, laid-open on Nov. 23, 2016, and entitled "Method for Estimating Direction of Arrival and Apparatus for Estimating Direction of Arrival using the same."

The above information disclosed in this section is only for understanding the background of the inventive concepts, and, therefore, may contain information that does not form prior art.

SUMMARY

Some aspects provide an apparatus capable of estimating a DOA through an arrangement of multiple Tx antennas in a MIMO system using a deterministic maximum likelihood (DML) algorithm.

Some aspects provide a method capable of estimating a DOA through an arrangement of multiple Tx antennas in a MIMO system using a deterministic maximum likelihood (DML) algorithm.

Some aspects provide an apparatus capable of accurately identifying from which Tx antenna a signal has been received when a plurality of Rx antennas receive signals from a plurality of Tx antennas at the same time.

Some aspects provide a method capable of accurately identifying from which Tx antenna a signal has been received when a plurality of Rx antennas receive signals from a plurality of Tx antennas at the same time.

Additional aspects will be set forth in the detailed description which follows, and, in part, will be apparent from the disclosure, or may be learned by practice of the inventive concepts.

According to some aspects, an apparatus for estimating a direction of arrival (DOA) in a multiple input, multiple output (MIMO) system includes a receiver and a signal processor. The receiver is configured to: receive Rx signals reflected and returned from a forward target through two or more Rx antennas after Tx signals having different phases are transmitted through two Tx antennas; and transform the Rx signals into time domain Rx signals. The signal processor is configured to: transform the time domain Rx signals from the receiver into Rx signals in a frequency domain, the frequency domain including a range-related domain and a velocity-related doppler domain; divide the doppler domain into two regions according to a phase difference between the Tx signals used by the Tx antennas; extract signals from the two regions; combine the signals extracted from the two regions to form a first array and a second array; determine a minimum value for each of the first array and the second array using a deterministic maximum likelihood (DML) algorithm; select one of the first and second arrays having the minimum value as a true array; and estimate a DOA corresponding to the true array as an actual DOA of the forward target.

In an embodiment, as part of transforming the time domain Rx signals into the frequency domain Rx signals, the signal processor may be configured to: transform the time domain Rx signals into complex number signals using a Hilbert transform algorithm; transform the complex number signals into frequency domain signals by performing two fast Fourier transform (FFT) processes on the complex number signals; perform calibration on the frequency domain signals.

In an embodiment, as part of extracting the signals from the two regions, the signal processor may be configured to: divide the doppler domain, which is a second FFT region, into two regions according to the phase difference; and extract a doppler frequency and a peak value corresponding to each of the two regions from each of the two regions.

In an embodiment, as part of determining the minimum value, the signal processor may be configured to: define the signals extracted from the two regions as a first signal and a second signal, respectively; combine the first and second signals in the first array with the second signal positioned after the first signal and the second array with the first signal positioned after the second signal; and determine the minimum value for each of the first and second arrays using the DML algorithm.

According to some aspects, a method for estimating a direction of arrival (DOA) in a multiple input, multiple output (MIMO) system includes: receiving, by a receiver, Rx signals reflected and returned from a forward target through two or more Rx antennas after Tx signals having different phases are transmitted through two Tx antennas; transforming, by the receiver, the Rx signals into time domain Rx signals; transforming, by a signal processor, the time domain Rx signals from the receiver into Rx signals in a frequency domain, the frequency domain including a range-related domain and a velocity-related doppler domain; dividing, by the signal processor, the doppler domain into two regions according to a phase difference between the Tx signals used by the respective Tx antennas; extracting, by the signal processor, signals from the two regions; combining, by the signal processor, the signals extracted from the two regions to form a first array and a second array; determining, by the signal processor, a minimum value for each of the first and second arrays using a deterministic maximum likelihood (DML) algorithm; selecting, by the signal processor, one array of the first and second arrays having the minimum value as a true array; and estimating, by the signal processor, a DOA corresponding to the true array as an actual DOA of the forward target.

In an embodiment, transforming the time domain Rx signals into the frequency domain Rx signals may include: transforming the time domain Rx signals into complex number signals using a Hilbert transform algorithm; transforming the complex number signals into frequency domain signals by performing two fast Fourier transform (FFT) processes on the complex number signals; and performing calibration on the frequency domain signals.

In an embodiment, extracting the signals may include: dividing the doppler domain, which is a second FFT region, into two regions according to the phase difference; extracting a doppler frequency and a peak value corresponding to each of the two regions from each of the two regions.

In an embodiment, determining the minimum value may include: defining the signals extracted from the two regions as a first signal and a second signal, respectively; combining the first and second signals in the first array with the second signal positioned after the first signal and the second array with the first signal positioned after the second signal; and determining the minimum value for each of the first and second arrays using the DML algorithm.

A method and system may also be provided for implementing at least one exemplary embodiment, as well as a computer program, e.g., one or more sequences of one or more instructions, for executing the method.

According to various exemplary embodiments, an apparatus and a method can accurately estimate a DOA through an arrangement of multiple Tx antennas using the DML algorithm. When the DOA is accurately estimated, upper logics (e.g., SCC, FAC, AEB, and/or the like) can accurately track a forward target. Furthermore, when the plurality of Rx antennas in a MIMO system receive signals from the plurality of Tx antennas at the same time, it is possible to accurately identify from which Tx antenna a signal has been received.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF SOME EXEMPLARY EMBODIMENTS

Figure 1:
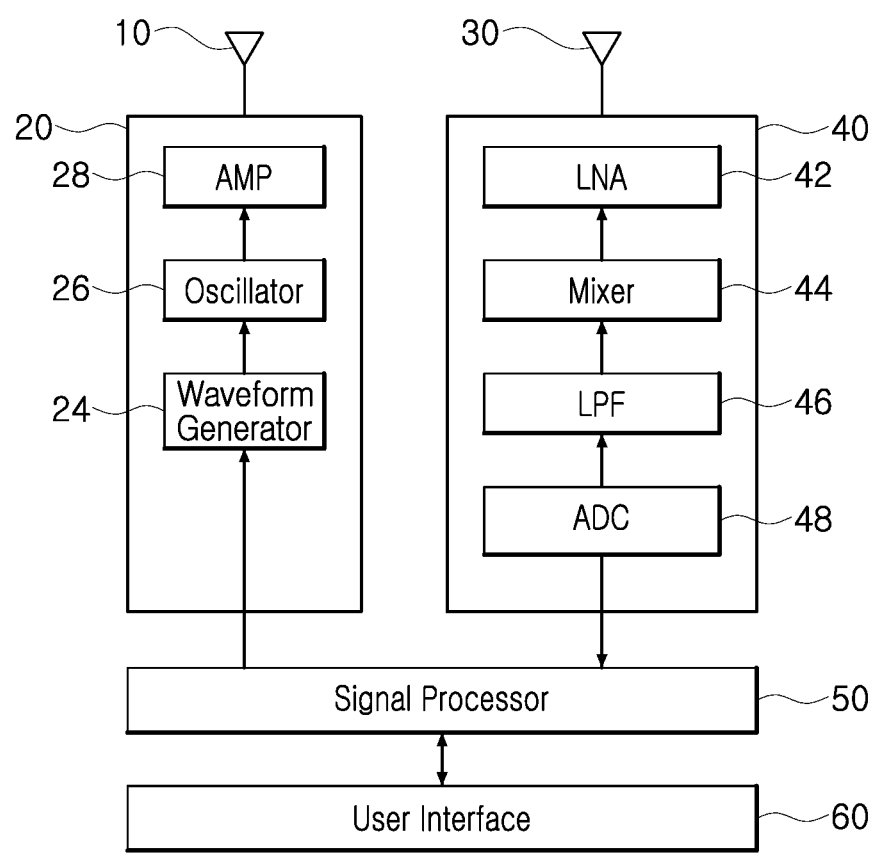
FIG. 1 is a block diagram illustrating an apparatus for estimating a direction of arrival (DOA) in a multiple input, multiple output (MIMO) system according to some exemplary embodiments.
Figure 2:
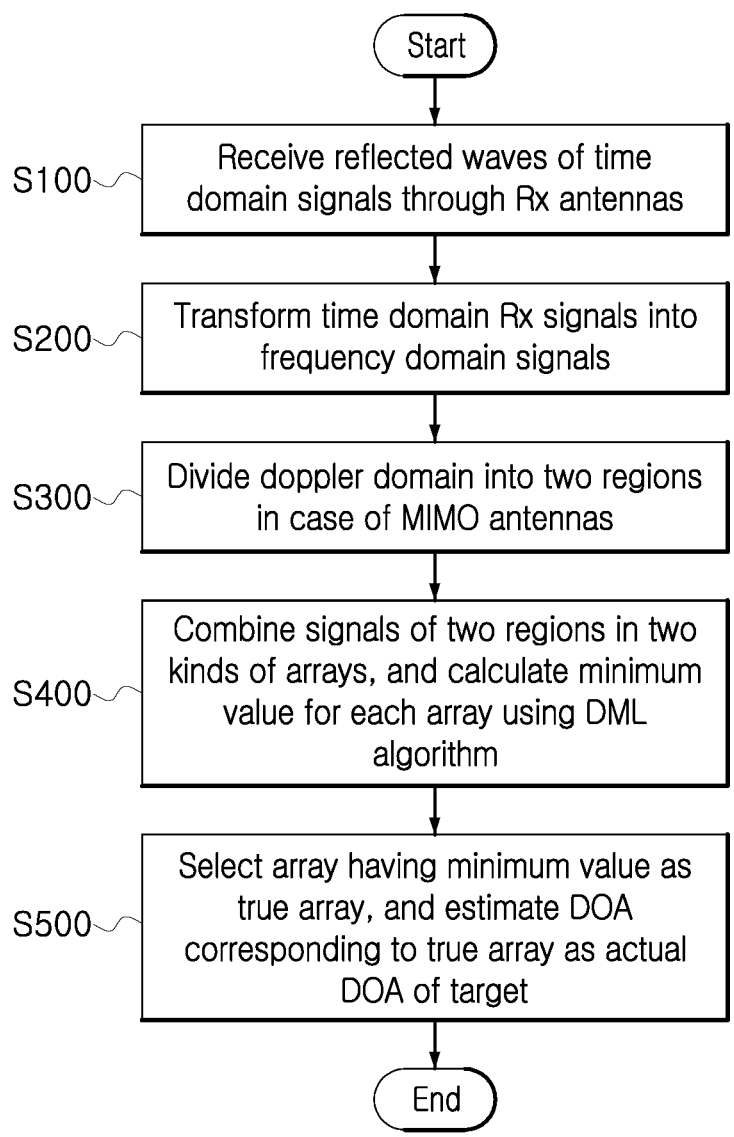
FIG. 2 is a flowchart illustrating a method for estimating a DOA in a MIMO system according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching, shading, and/or line thickness in the accompanying drawings is generally provided to clarify boundaries between adjacent elements. As such, neither the presence nor the absence of cross-hatching, shading, and/or line thicknesses indicates any preference or requirement for particular materials, material properties, dimensions, proportions, commonalities between illustrated elements, and/or any other characteristic, attribute, property, etc., of the elements, unless specified. Also, in the accompanying drawings, the size and relative sizes of elements may be exaggerated for clarity and/or descriptive purposes.

As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments may be described herein with reference to sectional views, isometric views, perspective views, plan views, and/or exploded depictions that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments for an apparatus and a method for estimating a direction of arrival (DOA) in a multiple input, multiple output (MIMO) system will be described with reference to the accompanying drawings.

FIG. 1 is a block diagram illustrating an apparatus for estimating a DOA in a MIMO system according to some exemplary embodiments. In some exemplary embodiments, the MIMO system may collectively refer to systems that transmit Tx signals through two or more Tx antennas and receive signals reflected from a target through two or more Rx antennas. In this case, each of the two or more Rx antennas should accurately identify from which Tx antenna the Rx antenna has received a signal. Exemplary embodiments for implementing such a configuration will now be described.

Referring to FIG. 1, an apparatus for estimating a DOA in a MIMO system may include a receiver 40 connected to an Rx antenna 30, a transmitter 20 connected to a Tx antenna 10, and a signal processor 50 connected to the transmitter 20 and the receiver 40. In some exemplary embodiments, the apparatus for estimating a DOA may further include a user interface 60 connected to the signal processor 50.

Each of the Rx antenna 30 and the Tx antenna 10 may include a plurality of antennas. For instance, the Rx antenna 30 may have an ULA antenna array in which the plurality of antennas are arranged in line at even intervals. When a radio frequency (RF) signal is transmitted through the Tx antenna 10, the Rx antenna 30 may receive a signal reflected and returned from a forward target.

The transmitter 20 wirelessly transmits a radar signal to the forward target through the Tx antenna 10. In an exemplary embodiment, the transmitter 20 may include a waveform generator 24, an oscillator 26, and an amplifier (AMP) 28. The waveform generator 24 may generate a signal having an analog waveform with a desired period and shape based on a digital Tx signal provided by the signal processor 50. For example, the waveform generator 24 may provide a triangle-waveform modulated signal as a Tx signal to the oscillator 26. The oscillator 26 may transform the Tx signal generated by the waveform generator 24 into an RF signal having a high frequency to wirelessly transmit the Tx signal. The oscillator 26 may modulate the frequency of the Tx signal provided by the waveform generator 24, for example. Furthermore, the oscillator 26 may provide the transformed RF signal as a reference signal to a mixer 44 of the receiver 40. The AMP 28 may amplify the RF signal output from the oscillator 26 into an output for transmission, and provide the amplified signal to the Tx antenna 10. The oscillator 26 may be configured as a voltage control oscillator (VCO), for example.

The receiver 40 may receive the RF signal, which is reflected and returned from the forward target after being transmitted by the Tx antenna 10, through the Rx antenna 30. The receiver 40 may down-transform (or demodulate) the RF signal based on the reference signal provided from the oscillator 26 of the transmitter 20, and then transform the down-transformed signal into a digital signal to provide to the signal processor 50. In accordance with an embodiment, the receiver 40 may include a low-noise amplifier (LNA) 42, a mixer 44, a low-pass filter (LPF) 46, and an analog-to-digital transformer (ADC) 48 for each of the antennas constituting the Rx antenna 30.

The LNA 42 may be connected to the corresponding antenna of the Rx antenna 30, and amplify a weak Rx signal caught (or received) by the Rx antenna 30. The Rx signal amplified by the LNA 42 may be provided to the mixer 44. The mixer 44 may down-transform the amplified Rx signal based on a frequency difference between the amplified Rx signal and the RF signal provided from the oscillator 26 of the transmitter 20. For example, the mixer 44 may determine (e.g., calculate) a frequency difference between the amplified Rx signal and the RF signal provided from the oscillator 26 of the transmitter 20 by mixing the amplified Rx signal and the RF signal, and acquire a beat signal having the calculated difference frequency as a frequency. The beat signal acquired by the mixer 44 may be converted into a digital signal by the ADC 48. The digital Rx signal acquired through such a process may be provided to the signal processor 50. The receiver 40 may further include the LPF 46 for removing a low-frequency component included in the beat signal output from the mixer 44.

According to some exemplary embodiments, the signal processor 50 may control overall operations of the transmitter 20, the receiver 40, and the user interface 60. The signal processor 50 may receive digital information corresponding to the signal reflected from the forward target from the receiver 40, perform computation on the received information according to a method, which will be described below, identify from which Tx antenna 10 the Rx antenna 30 has received the signal, and estimate the DOA of the received signal. The signal processor 50 may generate information, which is to be transmitted to the target through the Tx antenna 10, through signal processing, and provide the generated information to the transmitter 20. The signal processor 50 may be implemented as a digital signal processor (DSP), a microcomputer, and/or the like.

The user interface 60 may display the processing result of the signal processor 50 or transfer a user's instruction to the signal processor 50.

The configuration of the apparatus for estimating a DOA in a MIMO system in FIG. 1 is only an example, and the apparatus for estimating a DOA may have a different configuration depending on a radio signal modulation/demodulation method. The apparatus for estimating a DOA in a MIMO system may be installed in a vehicle and used as a radar device for the vehicle. A virtual antenna signal generation method in accordance with some exemplary embodiments may be implemented as a program, and the program may be embedded in the signal processor 50 and executed by the signal processor 50.

Figure 4:
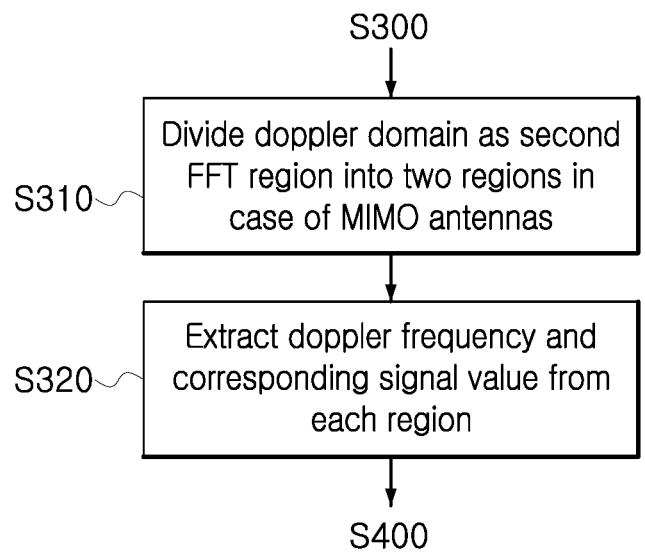
FIG. 4 is a flowchart illustrating a procedure of step S400 in the flowchart of FIG. 2 according to some exemplary embodiments.
Figure 5:
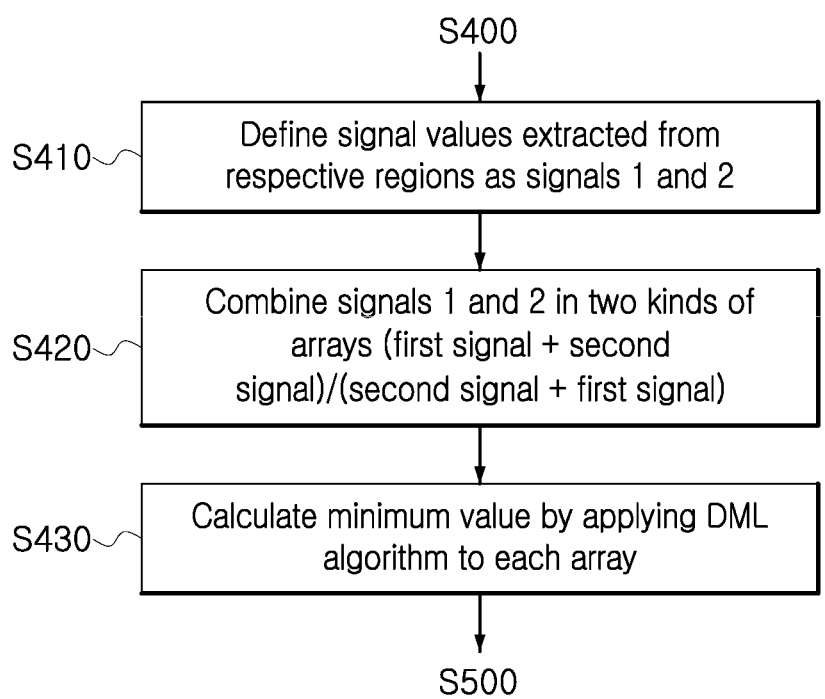
FIG. 5 is a flowchart illustrating a procedure of step S500 in the flowchart of FIG. 2 according to some exemplary embodiments.
Figure 6:
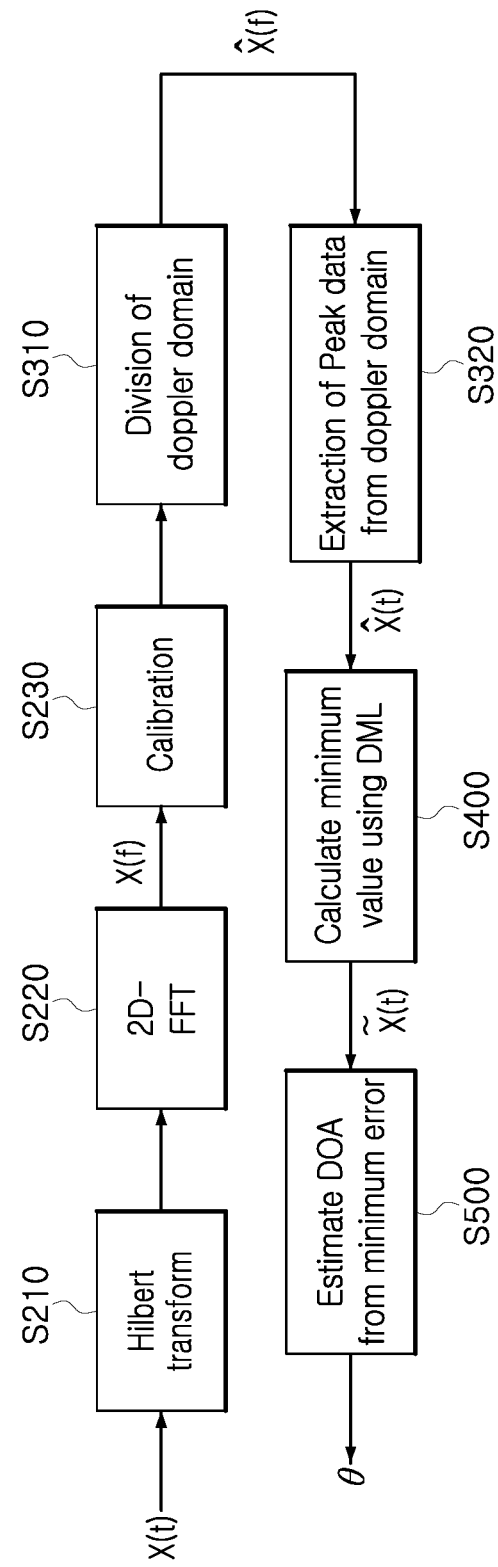
FIG. 6 is a diagram illustrating a process of determining an estimated DOA in a MIMO system according to some exemplary embodiments.
Figure 7A:
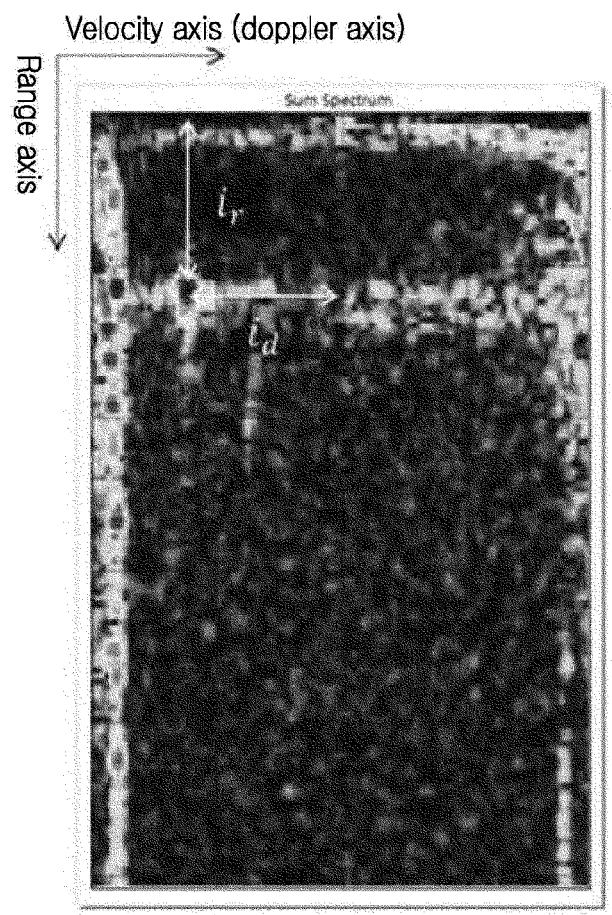
FIGS. 7A and 7B illustrate velocity-range spectra when two fast Fourier transform (FFT) processes are performed in FIG. 3 according to some exemplary embodiments.
Figure 7B:
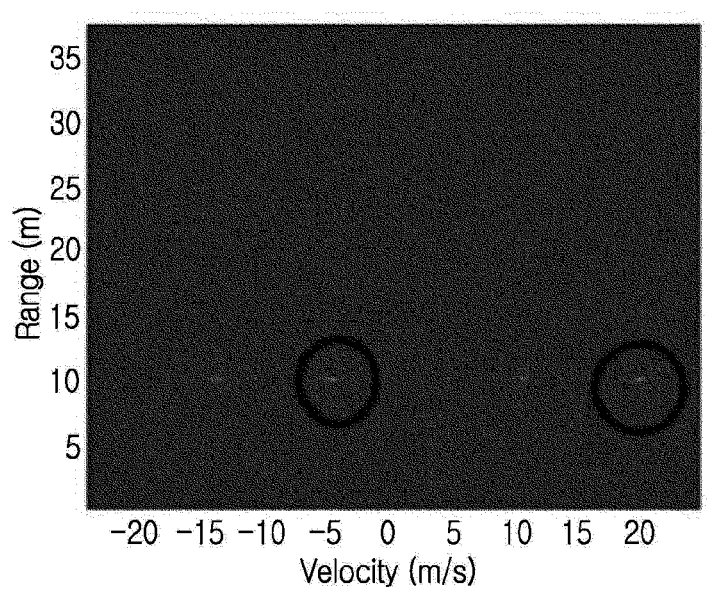

FIGS. 2 to 5 are flowcharts illustrating a method for estimating a DOA in a MIMO system according to some exemplary embodiments. FIG. 6 is a diagram illustrating a process of determining an estimated DOA in a MIMO system according to some exemplary embodiments. For instance, FIG. 6 illustrates a computation process in which the signal processor 50 of FIG. 1 estimates the DOA of an Rx signal based on a method according to at least one exemplary embodiment disclosed herein. FIGS. 7A and 7B illustrate velocity-range spectra when two fast Fourier transform (FFT) processes are performed in FIG. 3 according to some exemplary embodiments.

Referring to FIGS. 2 to 6, the receiver 40 receives Rx signals reflected and returned from a forward target through two or more Rx antennas 30 after two Tx antennas 10 transmit Tx signals having different phases, and transforms the received Rx signals into time domain Rx signals to provide to the signal processor 50, in step S100. Based on a digital Tx signal provided by the signal processor 50, the transmitter 20 may generate an RF signal and transmit the generated RF signal through the Tx antenna 10. The RF signal transmitted to the forward target through the Tx antenna 10 may be reflected from the forward target. Each of the antennas of the Rx antenna 30 may receive the RF signal reflected and returned from the forward target, and transmit the received RF signal to the receiver 40. As described above, the receiver 40 may generate a beat signal based on a frequency difference between the RF signal received by each of the Rx antennas 30 and the RF signal provided from the oscillator 26, and transform the generated beat signal into a digital signal to provide to the signal processor 50. The Rx signal provided to the signal processor 50 by the receiver 40 is a time domain signal.

Figure 3:
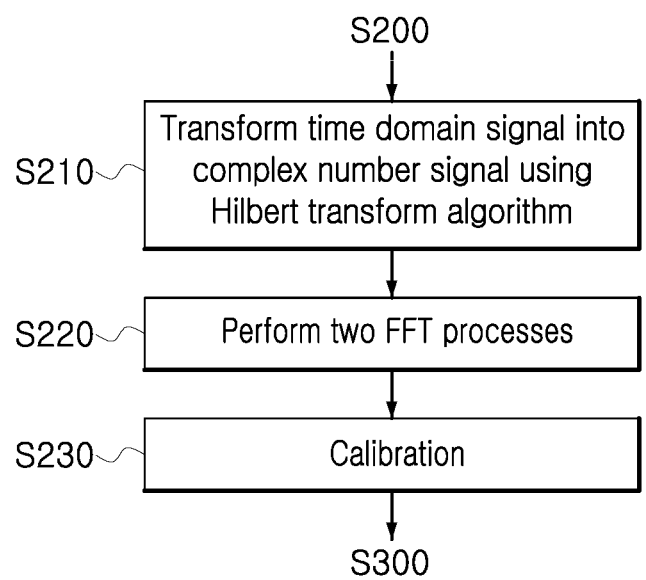
FIG. 3 is a flowchart illustrating a procedure of step S200 in the flowchart of FIG. 2 according to some exemplary embodiments.

In step S200, the signal processor 50 transforms the time-domain Rx signal into a frequency domain signal. The frequency domain includes a domain related to range and a doppler domain related to velocity. FIG. 3 illustrates a procedure of step S200 according to some exemplary embodiments.

Referring to FIG. 3, the signal processor 50 transforms the time domain signal from the receiver 40 into a complex number signal using the Hilbert transform algorithm in step S210. In step S220, the signal processor 50 transforms the complex number signal into a frequency domain signal by performing two FFT processes on the complex number signal. The signal processor 50 may acquire range information of the target through the first FFT process, and acquire velocity information of the target through the second FFT process. In step S230, the signal processor 50 performs calibration on the transformed frequency domain signal.

In step S300, when two Tx antennas (MIMO antennas) 10 use two Tx signals having different phases, the signal processor 50 divides the doppler domain (second frequency domain) into a region of the signal transferred from the first Tx antenna 10 and a region of the signal transferred from the second Tx antenna 10. FIG. 4 illustrates a procedure of step S300 according to some exemplary embodiments.

Referring to FIG. 4, when two Tx signals having different phases are used, the signal processor 50 divides the doppler domain serving as the second FFT domain into two regions according to a phase difference between the two signals, in step S310. In step S320, the signal processor 50 extracts a doppler frequency in each of the regions and a peak value corresponding to the regions. The x-axis of the entire frequency domain becomes the doppler domain, and the y-axis of the entire frequency domain becomes the range domain. In the case of signals in the same range, two peak points having different frequencies in the doppler domain may be found. The signal values (or peak values) from the two peak points have a complex number value like a+bj. As illustrated in FIGS. 7A and 7B, the frequency domain signal is generated in the form of spectrum. FIG. 7A illustrates a velocity-range spectrum when two FFT processes are performed in a system which is not the MIMO system, and FIG. 7B illustrates a velocity-range spectrum when two FFT processes are performed in the MIMO system. In FIG. 7A, red dots may indicate that the peak (signal intensity) is strong. When Tx signals having a phase difference are used, the doppler domain is divided into two regions to generate two signals. In FIG. 7B, black circles indicate that two signals, which are the same signals but have a phase difference, are divided into two signals in the same doppler domain.

In step S400, the signal processor 50 MIMO-combines the signals of the two regions in two kinds of arrays, and determines (e.g., calculates) the minimum value in each of the arrays using the deterministic maximum likelihood (DML) algorithm. The DML indicates an algorithm for estimating an angle using a correlation matrix of Rx signals having high correlation. The likelihood function, which is a probability density function of all given measured values, is used for estimating a desired variable (e.g., angle) from a statistical assumption. FIG. 5 illustrates a procedure of step S400 according to some exemplary embodiments.

Referring to FIG. 5, the signal processor 50 defines the peak values extracted from the respective regions as a first signal and a second signal, per step S410. In step S420, the signal processor 50 combines the first signal and the second signals in two kinds of arrays, e.g., a first array and a second array. The first array may include an array in which the second signal is positioned after the first signal, and the second array may include an array in which the first signal is positioned after the second signal. In step S430, the signal processor 50 calculates the minimum value by applying the DML algorithm to the first and second arrays.

In step S500, the signal processor 50 selects the array having the minimum value as a true array, and estimates a DOA corresponding to the true array as the actual DOA of the target. The signal processor 50 may determine that any one array having the smaller minimum value between the first and second arrays is the true array and the other array is a false array, and select the true array.

Figure 8A:
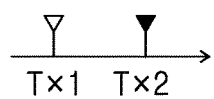
FIGS. 8A, 8B, and 8C are diagrams illustrating a true array and a false array of Rx antennas with respect to Tx antennas in a MIMO system according to some exemplary embodiments.
Figure 8B:
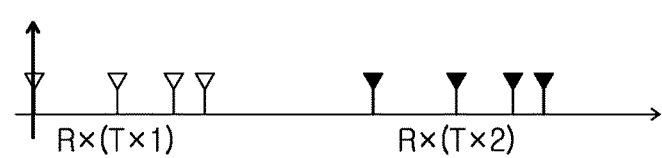
Figure 8C:
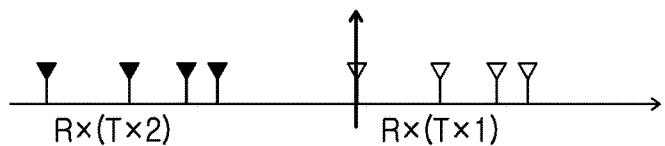

FIGS. 8A to 8C are diagrams illustrating a true array and a false array of Rx antennas with respect to Tx antennas in a MIMO system according to some exemplary embodiments. For instance, FIG. 8A illustrates two Tx antenna Tx1 and Tx2, and FIGS. 8B and 8C illustrate an array of a plurality of Rx antennas 30 with respect to the two Tx antennas Tx1 and Tx2. The plurality of Rx antennas 30 may include the same number of virtual Rx antennas as the number of actual Rx antennas. FIG. 8B illustrates a first array (Rx(Tx1), Rx(Tx2)) of the Rx antennas 30 with respect to the two Tx antennas Tx1 and Tx2. FIG. 8C illustrates a second array (Rx(Tx2), Rx(Tx1)) of the Rx antennas 30 with respect to the two Tx antennas Tx1 and Tx2. The signal processor 50 may determine that any one array (e.g., the first array in FIGS. 8A to 8C) having the smaller minimum value between the first and second arrays is the true array and the other array (e.g., the second array in FIGS. 8A to 8C) is the false array, and select the true array. When the plurality of Rx antennas (Rx(Tx1), Rx(Tx2)) receive signals from the plurality of Tx antennas Tx1 and Tx2 at the same time, the signal processor 50 may calculate the minimum value to determine that any one of the first and second arrays is a true array and the other is a false array, and select the true array, thereby accurately identifying from which Tx antenna a signal has been received.

Figure 9:
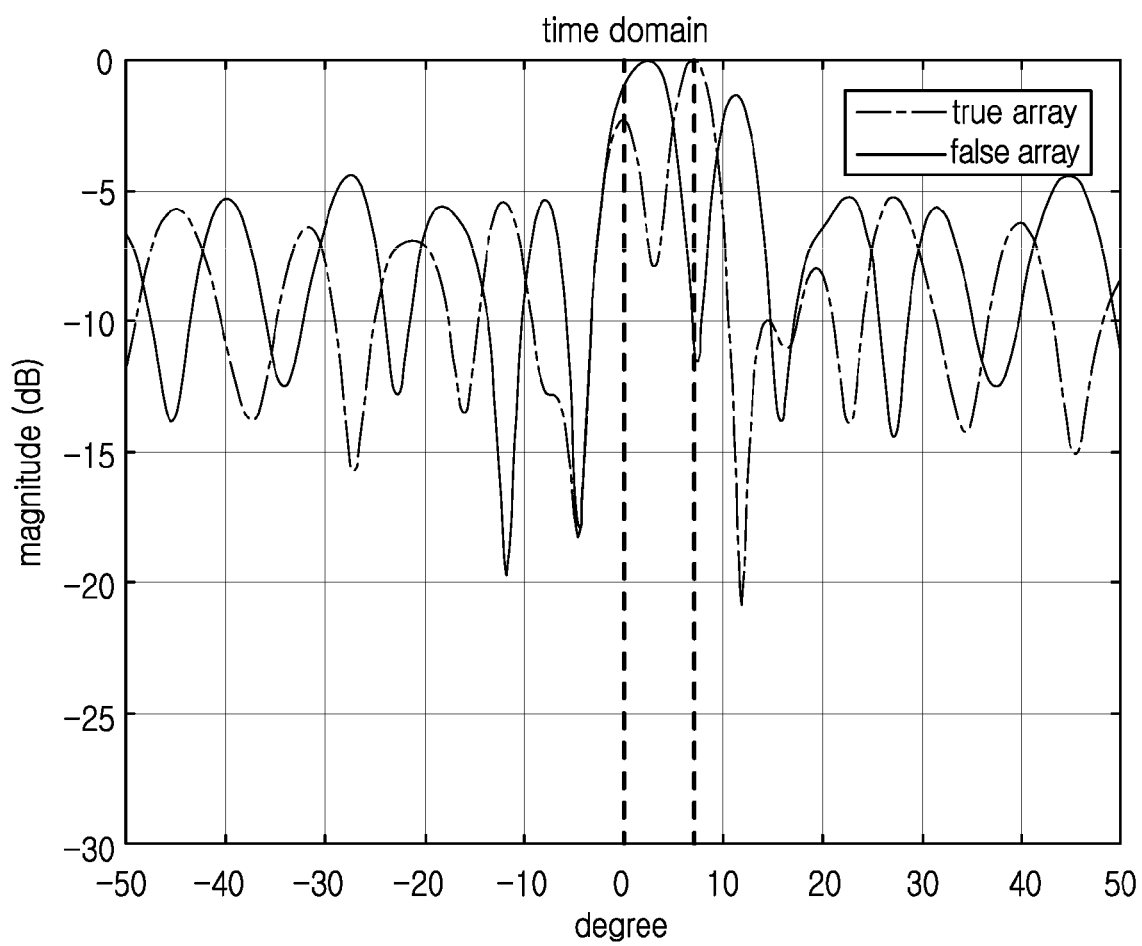
FIG. 9 is a graph illustrating the accuracies of DOAs in the case of a true array and a false array of Rx antennas with respect to Tx antennas in a MIMO system according to some exemplary embodiments.

FIG. 9 is a graph illustrating the accuracies of DOAs in the case of a true array and a false array of Rx antennas with respect to Tx antennas in a MIMO system according to some exemplary embodiments. In FIG. 9, a black dotted line indicates the position where the target is actually present. In the case of the true array, the DOA is estimated as a similar value to an actual position. In the case of the false array, however, the DOA is estimated as a value deviating from an actual position.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An apparatus for estimating a direction of arrival (DOA) in a multiple input, multiple output (MIMO) system, the apparatus comprising:
   a receiver configured to:
      receive Rx signals reflected and returned from a forward target through two or more Rx antennas after Tx signals having different phases are transmitted through two Tx antennas; and
      transform the Rx signals into time domain Rx signals; and
   a signal processor configured to:
      transform the time domain Rx signals from the receiver into Rx signals in a frequency domain, the frequency domain comprising a range-related domain and a velocity-related doppler domain;

divide the doppler domain into two regions according to a phase difference between the Tx signals used by the Tx antennas;

extract signals from the two regions;

combine the signals extracted from the two regions to form a first array and a second array;

determine a minimum value for each of the first array and the second array using a deterministic maximum likelihood (DML) algorithm;

select one of the first and second arrays having the minimum value as a true array; and estimate a DOA corresponding to the true array as an actual DOA of the forward target.

2. The apparatus of claim 1, wherein, as part of transforming the time domain Rx signals into the frequency domain Rx signals, the signal processor is configured to:

transform the time domain Rx signals into complex number signals using a Hilbert transform algorithm;

transform the complex number signals into frequency domain signals by performing two fast Fourier transform (FFT) processes on the complex number signals; and perform calibration on the frequency domain signals.

3. The apparatus of claim 2, wherein, as part of extracting the signals from the two regions, the signal processor is configured to:

divide the doppler domain, which is a second FFT region, into two regions according to the phase difference; and extract a doppler frequency and a peak value corresponding to each of the two regions from each of the two regions.

4. The apparatus of claim 1, wherein, as part of determining the minimum value, the signal processor is configured to:

define the signals extracted from the two regions as a first signal and a second signal, respectively;

combine the first and second signals in the first array with the second signal positioned after the first signal and the second array with the first signal positioned after the second signal; and determine the minimum value for each of the first and second arrays using the DML algorithm.

5. A method for estimating a direction of arrival (DOA) in a multiple input, multiple output (MIMO) system, the method comprising:

receiving, by a receiver, Rx signals reflected and returned from a forward target through two or more Rx antennas after Tx signals having different phases are transmitted through two Tx antennas;

transforming, by the receiver, the Rx signals into time domain Rx signals;

transforming, by a signal processor, the time domain Rx signals from the receiver into Rx signals in a frequency domain, the frequency domain comprising a range-related domain and a velocity-related doppler domain;

dividing, by the signal processor, the doppler domain into two regions according to a phase difference between the Tx signals used by the respective Tx antennas;

extracting, by the signal processor, signals from the two regions;

combining, by the signal processor, the signals extracted from the two regions to form a first array and a second array;

determining, by the signal processor, a minimum value for each of the first and second arrays using a deterministic maximum likelihood (DML) algorithm; and selecting, by the signal processor, one array of the first and second arrays having the minimum value as a true array; and estimating, by the signal processor, a DOA corresponding to the true array as an actual DOA of the forward target.

6. The method of claim 5, wherein transforming the time domain Rx signals into the frequency domain Rx signals comprises:

transforming the time domain Rx signals into complex number signals using a Hilbert transform algorithm;

transforming the complex number signals into frequency domain signals by performing two fast Fourier transform (FFT) processes on the complex number signals; and performing calibration on the frequency domain signals.

7. The method of claim 6, wherein extracting the signals comprises:

dividing the doppler domain, which is a second FFT region, into two regions according to the phase difference; and extracting a doppler frequency and a peak value corresponding to each of the two regions from each of the two regions.

8. The method of claim 5, wherein determining the minimum value comprises:

defining the signals extracted from the two regions as a first signal and a second signal, respectively;

combining the first and second signals in the first array with the second signal positioned after the first signal and the second array with the first signal positioned after the second signal; and determining the minimum value for each of the first and second arrays using the DML algorithm.

* * * * *